(12) United States Patent
Young

(10) Patent No.: US 9,007,322 B1
(45) Date of Patent: *Apr. 14, 2015

(54) COMPENSATION OF SIGNAL VALUES FOR A TOUCH SENSOR

(71) Applicant: Cypress Semiconductor Corporation, San Jose, CA (US)

(72) Inventor: David W. Young, Meridian, ID (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/933,506

(22) Filed: Jul. 2, 2013

Related U.S. Application Data

(63) Continuation of application No. 12/508,487, filed on Jul. 23, 2009, now Pat. No. 8,482,536.

(60) Provisional application No. 61/083,093, filed on Jul. 23, 2008.

(51) Int. Cl.
G09G 5/00 (2006.01)
G06F 3/041 (2006.01)

(52) U.S. Cl.
CPC .................................. *G06F 3/0418* (2013.01)

(58) Field of Classification Search
CPC ..... G06F 3/041; G06F 3/0412; G06F 3/0414; G06F 3/0416; G06F 3/0418; G06F 3/03547
USPC .......................... 345/173, 174, 175, 104, 204; 178/18.03–18.09; 715/863, 864
See application file for complete search history.

(56) References Cited

U.S. PATENT DOCUMENTS

| | | |
|---|---|---|
| 5,374,787 A | 12/1994 | Miller et al. |
| 5,463,388 A | 10/1995 | Boie et al. |
| 5,914,465 A | 6/1999 | Allen et al. |
| 6,239,389 B1 | 5/2001 | Allen et al. |
| 6,288,707 B1 | 9/2001 | Philipp |
| 6,380,931 B1 | 4/2002 | Gillespie et al. |
| 6,414,671 B1 | 7/2002 | Gillespie et al. |
| 6,452,514 B1 | 9/2002 | Philipp |
| 6,506,983 B1 | 1/2003 | Babb et al. |
| 6,535,200 B2 | 3/2003 | Philipp |
| 6,610,936 B2 | 8/2003 | Gillespie et al. |
| 6,679,843 B2 * | 1/2004 | Ma et al. .................... 600/441 |
| 6,741,335 B2 * | 5/2004 | Kinrot et al. ................. 356/28 |
| 6,750,852 B2 | 6/2004 | Gillespie et al. |
| 6,933,931 B2 | 8/2005 | Lubarsky et al. |
| 7,006,080 B2 | 2/2006 | Gettemy |
| 7,109,978 B2 | 9/2006 | Gillespie et al. |

(Continued)

FOREIGN PATENT DOCUMENTS

TW 200625181 10/2009

OTHER PUBLICATIONS

USPTO Advisory Action for U.S. Appl. No. 12/508,487 dated Aug. 29, 2012; 3 pages.

(Continued)

*Primary Examiner* — Tom Sheng
(74) *Attorney, Agent, or Firm* — Lowenstein Sandler, LLP

(57) ABSTRACT

An apparatus includes a data conditioning module configured to translate each of a plurality of signal strength values to a compensated signal value, where the compensated signal value is a function of its corresponding signal strength value.

22 Claims, 10 Drawing Sheets

(56) References Cited

U.S. PATENT DOCUMENTS

| | | | |
|---|---|---|---|
| 7,148,704 | B2 | 12/2006 | Philipp |
| 7,400,318 | B2 | 7/2008 | Gerpheide et al. |
| 7,429,976 | B2 | 9/2008 | Harley et al. |
| 7,492,358 | B2 | 2/2009 | Chi et al. |
| 7,701,440 | B2 | 4/2010 | Harley |
| 7,868,875 | B2* | 1/2011 | Park et al. .................. 345/173 |
| 7,920,134 | B2 | 4/2011 | Krah |
| 7,965,281 | B2 | 6/2011 | Mackey |
| 8,482,536 | B1* | 7/2013 | Young ........................ 345/173 |
| 2004/0151358 | A1 | 8/2004 | Yanagita et al. |
| 2004/0212605 | A1 | 10/2004 | Fitzmaurice et al. |
| 2005/0068044 | A1 | 3/2005 | Peine et al. |
| 2005/0129292 | A1 | 6/2005 | Morgeneier et al. |
| 2005/0134292 | A1 | 6/2005 | Knoedgen |
| 2005/0243894 | A1 | 11/2005 | Chen et al. |
| 2006/0181627 | A1* | 8/2006 | Farrier ........................ 348/308 |
| 2006/0290677 | A1 | 12/2006 | Lyon et al. |
| 2007/0052690 | A1 | 3/2007 | Roberts |
| 2007/0074913 | A1 | 4/2007 | Geaghan et al. |
| 2007/0091078 | A1* | 4/2007 | Park et al. .................. 345/173 |
| 2008/0100586 | A1 | 5/2008 | Smart |
| 2008/0158175 | A1 | 7/2008 | Hotelling et al. |
| 2008/0158178 | A1* | 7/2008 | Hotelling et al. .......... 345/173 |
| 2008/0224912 | A1* | 9/2008 | Wang .......................... 341/155 |
| 2009/0122868 | A1 | 5/2009 | Chen et al. |
| 2011/0242045 | A1* | 10/2011 | Park et al. .................. 345/174 |

OTHER PUBLICATIONS

USPTO Final Rejection for U.S. Appl. No. 12/508,487 dated Mar. 6, 2013; 12 pages.

USPTO Final Rejection for U.S. Appl. No. 12/508,487 dated Jun. 21, 2012; 13 pages.

USPTO Non-Final Rejection for U.S. Appl. No. 12/508,487 dated Nov. 30, 2011; 12 pages.

USPTO Notice Of Allowance for U.S. Appl. No. 12/508,487 dated May 15, 2013; 6 pages.

U.S. Appl. No. 12/167,552: "Normalizing Capacitive Sensor Array Signals" Ryan D. Seguine et al., filed Jul. 3, 2008; 49 pages.

Chapweske, Adam; "The PS/2 Mouse Interface," PS/2 Mouse Interfacing, 2001, retrieved on May 18, 2006; 10 pages.

Cypress Semiconductor Corporation, "CY8C21x34 Data Sheet," CSR User Module, CSR V.1.0; Oct. 6, 2005; 36 pages.

Cypress Semiconductor Corporation, "Cypress Introduces PSoC(TM)-Based Capacitive Touch Sensor Solution," Cypress Press Release; May 31, 2005; <http://www.cypress.com/portal/server>; retrieved on Feb. 5, 2007; 4 pages.

Cypress Semiconductor Corporation, "FAN Controller CG6457AM and CG6462AM," PSoC Mixed Signal Array Preliminary Data Sheet; May 24, 2005; 25 pages.

Cypress Semiconductor Corporation, "PSoC CY8C20x34 Technical Reference Manual (TRM)," PSoC CY8C20x34 TRM, Version 1.0, 2006; 218 pages.

Cypress Semiconductor Corporation, "PSoC Mixed-Signal Controllers," Production Description; <http://www.cypress.com/portal/server>; retrieved on Sep. 27, 2005; 2 pages.

Cypress Semiconductor Corporation, "Release Notes srn017," Jan. 24, 2007; 3 pages.

Dennis Seguine, "Capacitive Switch Scan," Cypress Application Note AN2233a, Revision B, Apr. 14, 2005; 6 pages.

International Search Report for International Application No. PCT/US08/69108 dated Sep. 26, 2008; 2 pages.

Lee, Mark; "EMC Design Considerations for PSoC CapSense Applications," Cypress Semiconductor Corporation, Application Note AN2318; Sep. 16, 2005; 6 pages.

Requirement for Restriction/Election for U.S. Appl. No. 13/156,297 dated Dec. 1, 2011; 6 pages.

Sedra, Adel S. et al., "Microelectronic Circuits," 3rd Edition, Oxford University Press, pp. xiii-xx and 861-883, 1991; 20 pages.

Seguine, Ryan; "Layout Guidelines for PSoC CapSense," Cypress Semiconductor Corporation, Application Note AN2292; Jul. 22, 2005; 13 pages.

Taiwanese Office Action for Application No. 097125030 dated Feb. 27, 2014; 2 pages.

The Written Opinion of the International Searching Authority for International Application No. PCT/US08/69108 dated Sep. 26, 2008; 4 pages.

USPTO Final Rejection for U.S. Appl. No. 13/156,297 dated May 3, 2012; 22 pages.

USPTO Non Final Rejection for U.S. Appl. No. 12/167,552 dated May 18, 2010; 12 pages.

USPTO Non-Final Rejection for U.S. Appl. No. 13/156,297 dated Feb. 23, 2012; 13 pages.

USPTO Notice of Allowance for U.S. Appl. No. 12/167,552 dated Aug. 19, 2011; 9 pages.

USPTO Notice of Allowance for U.S. Appl. No. 12/167,552 dated Nov. 12, 2010; 8 pages.

USPTO Notice of Allowance for U.S. Appl. No. 13/156,297 dated Jul. 9, 2012; 8 pages.

USPTO Notice of Allowance for U.S. Appl. No. 13/156,297 dated Sep. 18, 2012; 8 pages.

Van Ess, David; "Simulating a 555 Timer with PSoC," Cypress Semiconductor Corporation, Application Note AN2286, May 19, 2005; 10 pages.

USPTO Non-Final Rejection for U.S. Appl. No. 14/171,746 dated Oct. 23, 2014; 21 pages.

* cited by examiner

COMPENSATION OF SIGNAL VALUES FOR A TOUCH SENSOR

RELATED APPLICATIONS

This application is a continuation of U.S. patent application Ser. No. 12/508,487, filed Jul. 23, 2009, which claims the benefit of U.S. Provisional Application No. 61/083,093, filed Jul. 23, 2008, all of which are herein incorporated by reference in their entirety.

TECHNICAL FIELD

This disclosure relates to the field of user interface devices and, in particular, to compensation for inputs detected at a touch-sensing surface.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infrared). The effect of such overlays allows a display to be used as an input device, removing the keyboard and/or the mouse as the primary input device for interacting with the display's content. Such displays can be attached to computers or, as terminals, to networks. There are a number of types of touch screen technologies, such as optical imaging, resistive, surface acoustical wave, capacitive, infrared, dispersive signal, piezoelectric, and strain gauge technologies. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to press the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

Figure 1A:
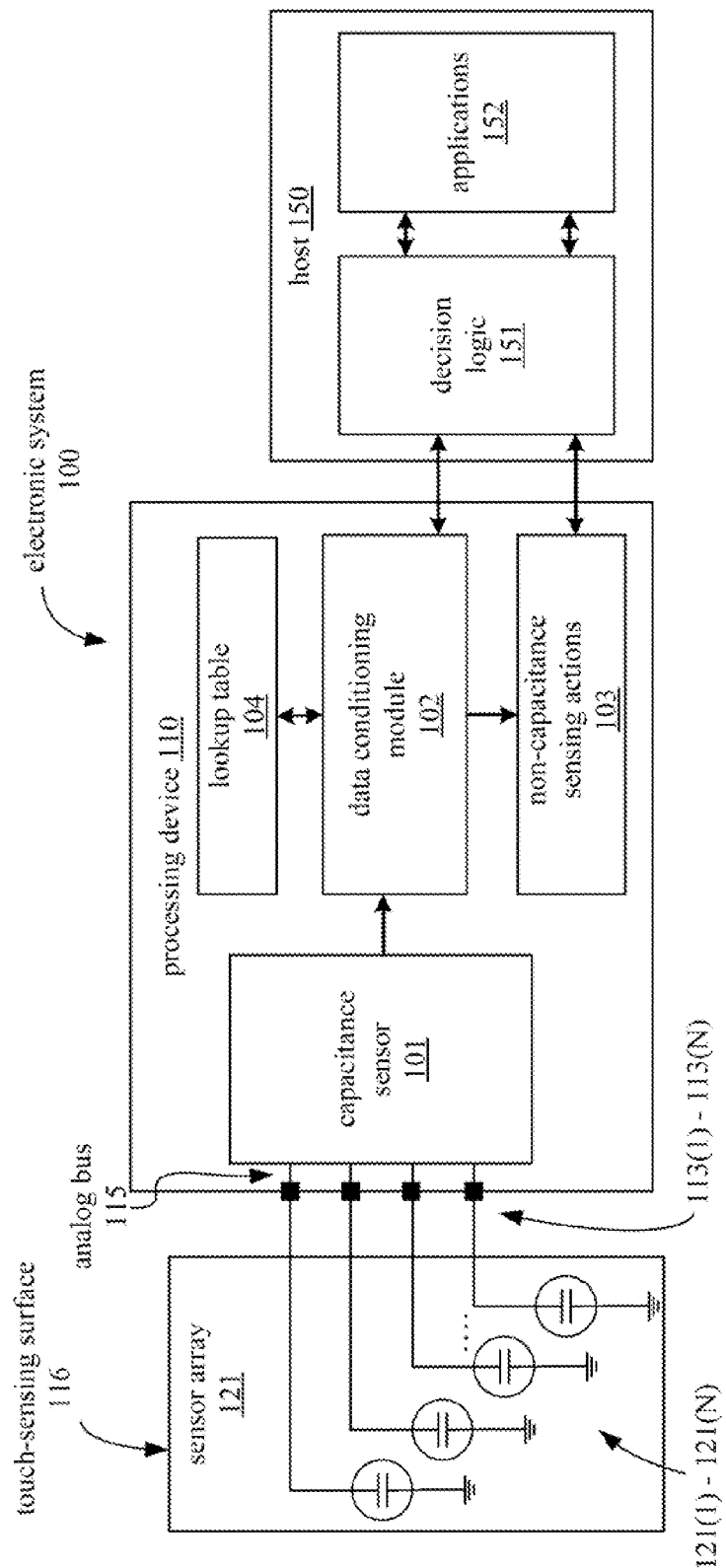
FIG. 1A illustrates a block diagram of one embodiment of an electronic system that processes touch sensor data.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

In applications where an electronic capacitive touch sensor system allows a user to manipulate a cursor or other objects on a display, accurate centroid calculations allow the cursor to accurately represent the position and motion of an object, such as a finger or stylus, on the touch-sensor. A centroid is a location that represents the "center of mass" or geometric center of an object at a touch-sensing surface. In one embodiment, a centroid may be represented as coordinates, such as X-Y coordinates in a Cartesian coordinate system. In embodiments wherein the capacitive touch sensor system measures the self capacitance of the sensor elements disposed along the X and Y axes, the center of mass for a touch is determined by the separate calculation of a 1-dimensional (1D) centroid for the X-axis sensor elements and a 1D centroid for the Y-axis sensor elements, wherein the intersection of the projection of these two 1D centroids into the sensor array determines the actual 2-dimensional (2D) centroid of the touch. In embodiments wherein the capacitive touch sensor system measures the mutual capacitance at the intersections of the sensor elements disposed along the X and Y axes, the center of mass for a touch is determined by a direct calculation of a 2D centroid. The accurate detection and calculation of centroid positions may also be important in applications where motion of a finger or stylus is tracked, such as drawing or handwriting recognition programs.

In one embodiment, a capacitive touch-sensor system may exhibit error in determining centroid position or movement due to the spacing and shape of adjacent sensor elements and the non-linear response of each sensor element's signal to the position of a finger or stylus. This error may affect the measurement and tracking of an object moving across the touch-sensing surface, or a position of an object located on the touch sensing surface.

In one embodiment, the amount of error caused by the pitch (i.e., center to center spacing) and response of the sensor elements can be decreased by translating the signal values measured at each sensor element to a corresponding compensated signal value before performing a centroid calculation. In one embodiment, the sensor data is translated using a Gaussian-based compression pattern to smooth out the signal variance between sensor elements. The translation may be effected using a lookup table of pre-computed values, which can be significantly faster than direct calculation of the complex numbers when fitting to a normal distribution.

Thus, this translation scheme may effectively reduce irregularities in a calculated position or path of motion of an object at the touch-sensing surface by dampening the response of the signal strength values of the sensor elements, while simultaneously decreasing processing time for each measured value.

The translation of sensor data may also be combined with other calculations for determining a centroid position, such as a linear expansion to correlate the sensor elements to other units, such as pixel spacing in a display, or physical distance (e.g., mm, inches).

In one embodiment, the translation scheme may replace computation intensive filtering and mapping, such as the use of Kalman filters (i.e., an efficient recursive filter that estimates the state of a linear dynamic system from a series of noisy measurements). The reduction of computation may improve performance of low-powered processors such as those used in many handheld or battery operated devices.

FIG. 1A illustrates a block diagram of one embodiment of an electronic system 100. The electronic system 100 includes a touch-sensing surface 116 (e.g., a touchscreen, a touch pad) coupled to a processing device 110 and a host 150. In one embodiment, the touch-sensing surface 116 is a two-dimensional user interface that is coupled to a processing device 110 to measure the self-capacitance of the elements in a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via an analog bus 115 transporting one or more signals. In this embodiment, each sensor element 121(1)-121(N) is represented as a capacitor. The self-capacitance of each sensor element of the sensor array 121 is measured by a capacitance sensor 101 in the processing device 110.

In one embodiment, the capacitance sensor 101 may include a relaxation oscillator, a sigma-delta modulator, or other means to convert a capacitance into a measured value. The capacitance sensor 101 may also include a counter or timer to measure the relative or absolute capacitance of each sensor element. The capacitance sensor 101 may further include software components to convert the count value (e.g., capacitance value) into a sensor element detection decision (also referred to as switch detection decision) or relative magnitude.

It should be noted that there are various known methods for measuring self-capacitance, such as current versus voltage phase shift measurement, resistor-capacitor charge timing, capacitive bridge divider, charge transfer, successive approximation, sigma-delta modulators, charge-accumulation circuits, field effect, frequency shift, or the like. It should be noted however, that instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the measurement, instead of the raw counts being over a certain threshold.

Figure 1B:
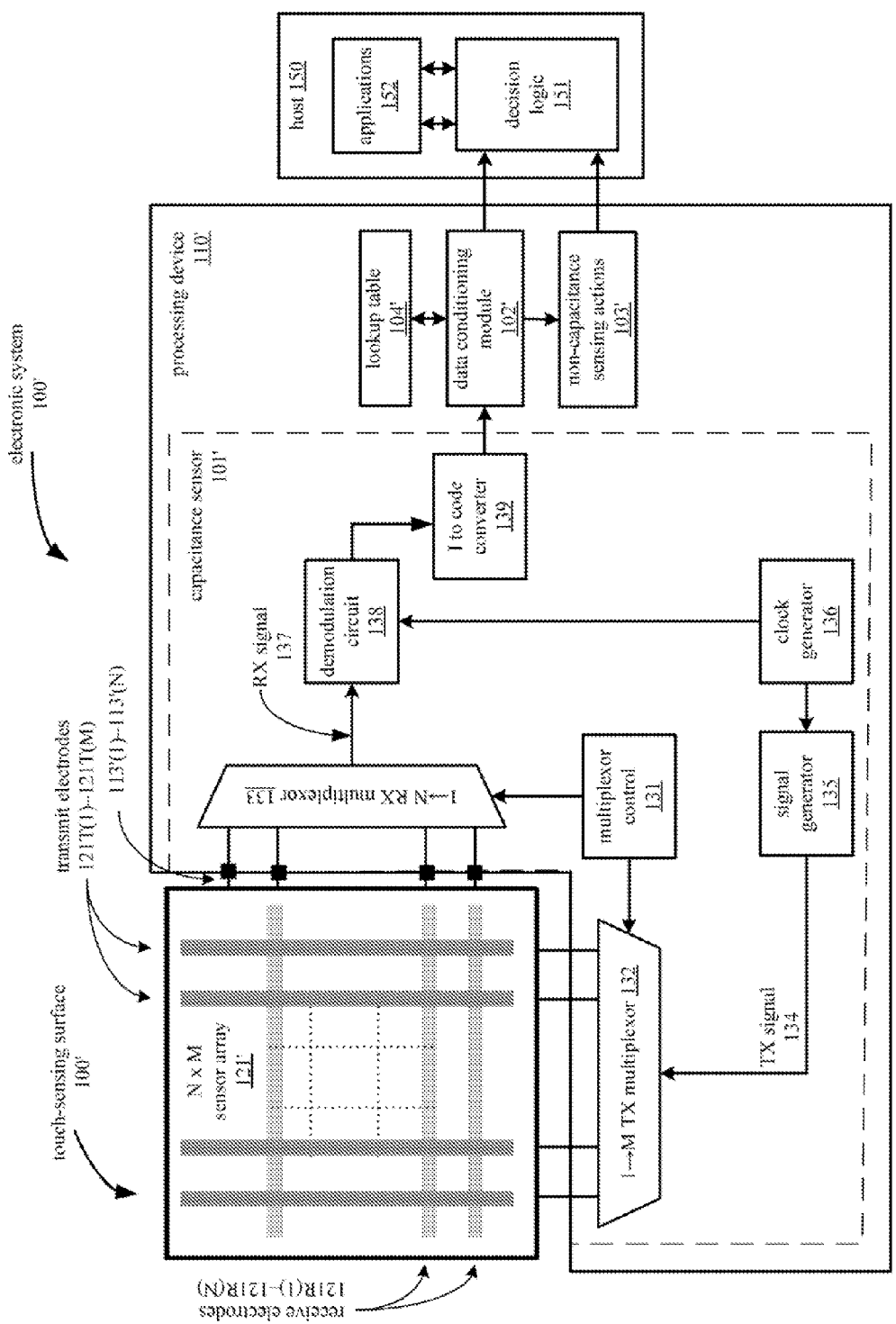
FIG. 1B illustrates a block diagram of an alternate embodiment of an electronic system that processes touch sensor data.

FIG. 1B illustrates a block diagram of another embodiment of an electronic system 100'. The electronic system 100' includes a touch-sensing surface 116' (e.g., a touchscreen, a touch pad) coupled to a processing device 110' and a host 150'. In one embodiment, the touch-sensing surface 116' is a two-dimensional user interface that is coupled to a processing device 110' to measure the mutual capacitance at the intersections of sensor elements in sensor array 121' to detect a plurality of touches on the surface 116'.

In one embodiment, the sensor array 121' includes transmit sensor elements 121T(1)-121T(M) (where M is a positive integer) that are disposed across one axis of a two-dimensional sensor matrix (also referred to as an XY matrix). Additionally the sensor array 121' includes receive sensor elements. 121R(1)-121R(N) (where N is a positive integer) that are disposed across the axis of a two-dimensional sensor matrix which is orthogonal to the transmit sensor elements. The receive sensor elements in array 121' are coupled to pins 113'(1)-113'(N) of the processing device 110' via an analog bus 115' (not shown) transporting one or more signals. In the embodiment shown in FIG. 1B, each receive sensor element 121R(1)-121R(N) is represented as a horizontal rectangle, and each transmit sensor element 121T(1)-121T(M) is represented by a vertical rectangle. The mutual-capacitance of each intersection of a transmit sensor element and receive element of the sensor array 121' is measured by a capacitance sensor 101' in the processing device 110'. Because each intersection of transmit and receive sensor elements may be separately measured for a change in mutual capacitance, these intersections may also be identified as sensor elements.

In one embodiment, the capacitance sensor 101' may include a signal generator 135 that may provide a modulation source signal for driving charge through the mutual capacitors located in the sensor array 121', said modulation source directed to one or more of the transmit electrodes 121T(1)-121T(M) through TX multiplexor 132. Capacitance sensor 101' may also include an RX multiplexor 133 which may direct the charge coupled onto the one or more of the N receive electrodes 121R(1)-121R(N) into any of a current conveyor, operational amplifier, transimpedance amplifier, current mirror, or other method of integrating the charge. Said charge may then be measured by a relaxation oscillator, a sigma-delta modulator, or other means to convert a charge into a measured value. The capacitance sensor 101' may also include a counter or timer to measure the relative or absolute capacitance of each sensor element intersection. The capacitance sensor 101' may further include software components to convert the count value (e.g., mutual capacitance value) into a sensor element detection decision (also referred to as switch detection decision) or relative magnitude.

It should be noted that there are various known methods for measuring mutual-capacitance, such as single-ended and differential charge accumulation, charge transfer, voltage differential, successive approximation, sigma-delta modulators, field effect, frequency shift, or the like. It should be noted however, that instead of evaluating the raw counts relative to a threshold, the capacitance sensor 101' may be evaluating other measurements to determine the user interaction. For example, in the capacitance sensor 101' having a sigma-delta modulator, the capacitance sensor 101' is evaluating the ratio of pulse widths of the measurement, instead of the raw counts being over or under a certain threshold.

In one embodiment, the processing device(s) 110 (and 110') further includes a data conditioning module 102 (and 102' respectively). Operations of the data conditioning module(s) 102/102' may be implemented in firmware; alternatively, it may be implemented in hardware or software. In one embodiment, the data conditioning module(s) 102/102' is configured to process the raw signal strength data from the capacitance sensor 101/101'. For example, the data conditioning module may perform filtering, maxima search, and centroid calculation based on the signal strength data. The data conditioning module(s) 102/102' may also include, or have access to, one or more lookup tables that stores pre-calculated compensation values. The data conditioning module(s) 102/102' may be configured to query the lookup table 104/104' with a signal strength value to obtain a compensation value corresponding to the signal strength value. In one embodiment, the data conditioning module 102/102' receives signals from the capacitance sensor 101/101', and determines the state of the sensor array 121/121', such as whether one or more conductive objects (e.g., a finger) are detected on or in proximity to the sensor array 121/121' (e.g., determining the presence of the one or more conductive objects), and wherein said conductive object is detected on the sensor array, tracking the motion of the conductive object, or the like.

In another embodiment, instead of performing the operations of the data conditioning module 102/102' in the processing device 110/110', the processing device 101/101' may send the raw data or partially-processed data to the host 150. The host 150, as illustrated in FIGS. 1A and 1B, may include decision logic 151 that performs some or all of the operations of the data conditioning module 102/102'. Operations of the decision logic 151 may be implemented in firmware, hardware, and/or software. The host 150 may include a high-level Application Programming Interface (API) in applications 152 that perform routines on the received data, such as compensating for sensitivity differences, other compensation algorithms, baseline update routines, start-up and/or initialization routines, interpolation operations, scaling operations, or the like. The operations described with respect to the data conditioning module 102/102' may be implemented in the decision logic 151, the applications 152, or in other hardware, software, and/or firmware external to the processing device 110/110'. In some other embodiments, the processing device 110/110' is the host 150.

In another embodiment, the processing device 110/110' may also include a non-capacitance sensing actions block 103/103'. This block 103/103' may be used to process and/or receive/transmit data to and from the host 150. For example, additional components may be implemented to operate with the processing device 110/110' along with the sensor array 121/121' (e.g., keyboard, keypad, mouse, trackball, LEDs, displays, or the like).

The processing device 110/110' may reside on a common carrier substrate such as, for example, an integrated circuit (IC) die substrate, a multi-chip module substrate, or the like. Alternatively, the components of the processing device 110/110' may be one or more separate integrated circuits and/or discrete components. In one embodiment, the processing device 110/110' may be a Programmable System on a Chip (PSoC™) processing device, developed by Cypress Semiconductor Corporation, San Jose, Calif. In one embodiment the processing device may be capable of both sensing self and mutual capacitance and thus implement both the capabilities of devices 110 and 110'. Alternatively, the processing device 110/110' may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device 110/110' may be a network processor having multiple processors including a core unit and multiple micro-engines. Additionally, the processing device 110/110' may include any combination of general-purpose processing device(s) and special-purpose processing device(s).

In one embodiment, the electronic system 100/100' is implemented in a device that includes the touch-sensing surface 116/116' as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or the like. Alternatively, the electronic system 100/100' may be used in other types of devices. It should be noted that the components of electronic system 100/100' may include all the components described above. Alternatively, electronic system 100/100' may include only some of the components described above, or include additional components not listed herein.

Figure 2:
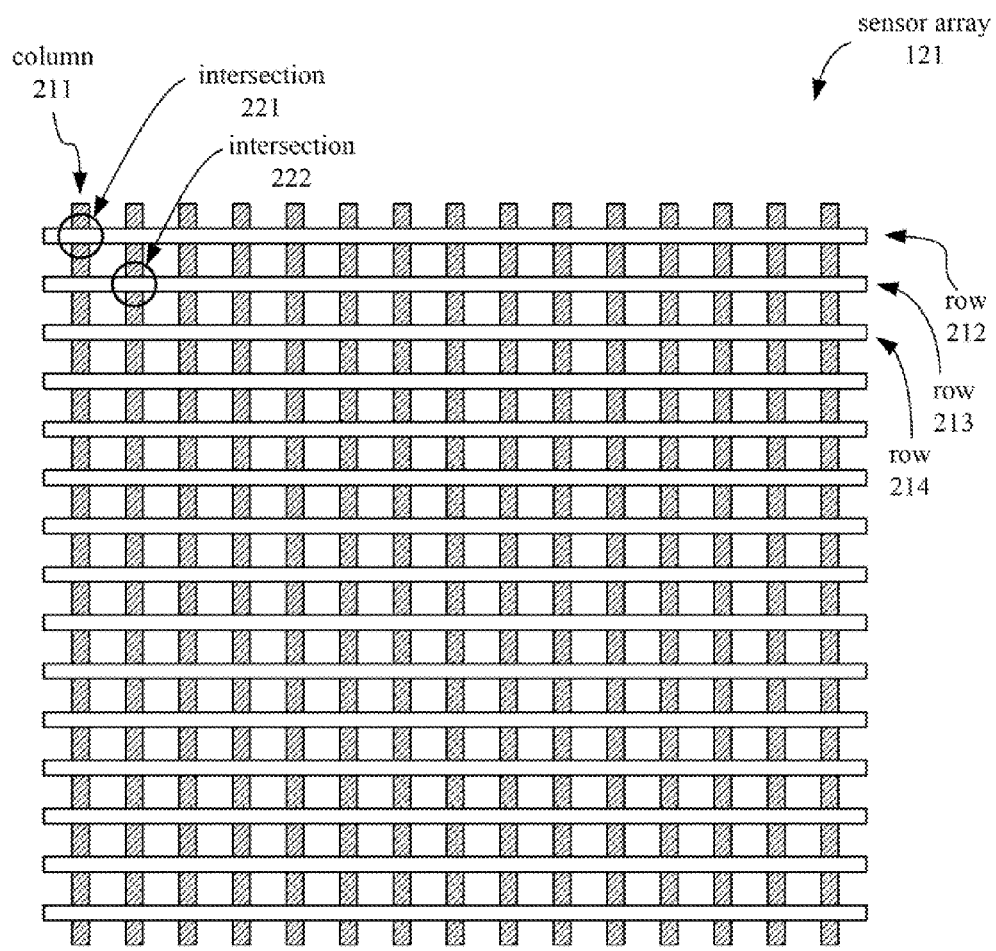
FIG. 2 illustrates an arrangement of capacitive sensor elements, according to one embodiment.

FIG. 2 illustrates sensor elements of a sensor array 121, according to one embodiment. The sensor elements of array 121 are arranged to create a grid of intersections between the vertically and horizontally arranged sensor elements. For example, row 212 and column 211 include intersection 221. When sensed for self-capacitance using the circuits and methods described relative to FIG. 1A, the sensor array 121 can be used to detect a location of a conductive object on a touch-sensing surface by measuring capacitances associated with each of the sensor elements in sensor array 121. Based on these measured capacitances, logic in the processing device 110 or the host 150, such as the data conditioning module 102 or the decision logic 151, may calculate a centroid for an object causing changes in capacitance at the touch-sensing surface.

When the sensor elements in sensor array 121 are sensed for mutual capacitance using the circuits and methods described relative to FIG. 1B, the sensor array 121 can be used to detect a location of multiple conductive objects on a touch-sensing surface by measuring capacitances associated with each intersection of the rows and columns of sensor elements in sensor array 121. Based on these measured capacitances, logic in the processing device 110' or the host 150, such as the data conditioning module 102' or the decision logic 151, may calculate one or more centroids for objects causing changes in capacitance at the touch-sensing surface.

A centroid may be considered as the "center of mass" for an object detected at the touch-sensing surface, such as a finger or stylus. The centroid can be used to indicate the location of the object at the touch-sensing surface and may be transmitted to a computer system for processing. For example, the centroid may be used to correlate the location of the object at the touch-sensing surface with a location of a cursor on a display.

In one embodiment, computing each centroid may include filtering of raw data from the sensor elements, establishing a baseline based on the filtered, historical or temporal data, finding local maxima in the data, and determining coordinates of the centroid.

When an M column by N row (M×N) matrix of touch sensor array 121 is evaluated for touches using self capacitance, M+N raw data conversions (i.e., measurements) are performed. Each conversion generates a value that represents the self capacitance for each row and column sensor element in the touch sensor array 121, for example, row 212 and column 211 of array 121 as illustrated in FIG. 2. When an M column by N row (M×N) matrix of touch sensor array 121 is evaluated for touches using mutual capacitance, M*N raw data conversions are performed. Each conversion generates a value that represents the mutual capacitance for each row and column crossing in the touch sensor array 121, for example, intersection 221 of row 212 and column 211 of array 121 as illustrated in FIG. 2. In one embodiment, these raw data values are sent to host processor 150 for processing. Alternatively, the processing may be performed by data conditioning module 102/102'. Processing the raw data may include filtering to minimize noise. In one embodiment, such filtering may be achieved by one or more successive filters, including but not limited to a median filter, and IIR filter, and a jitter filter.

Figure 3:
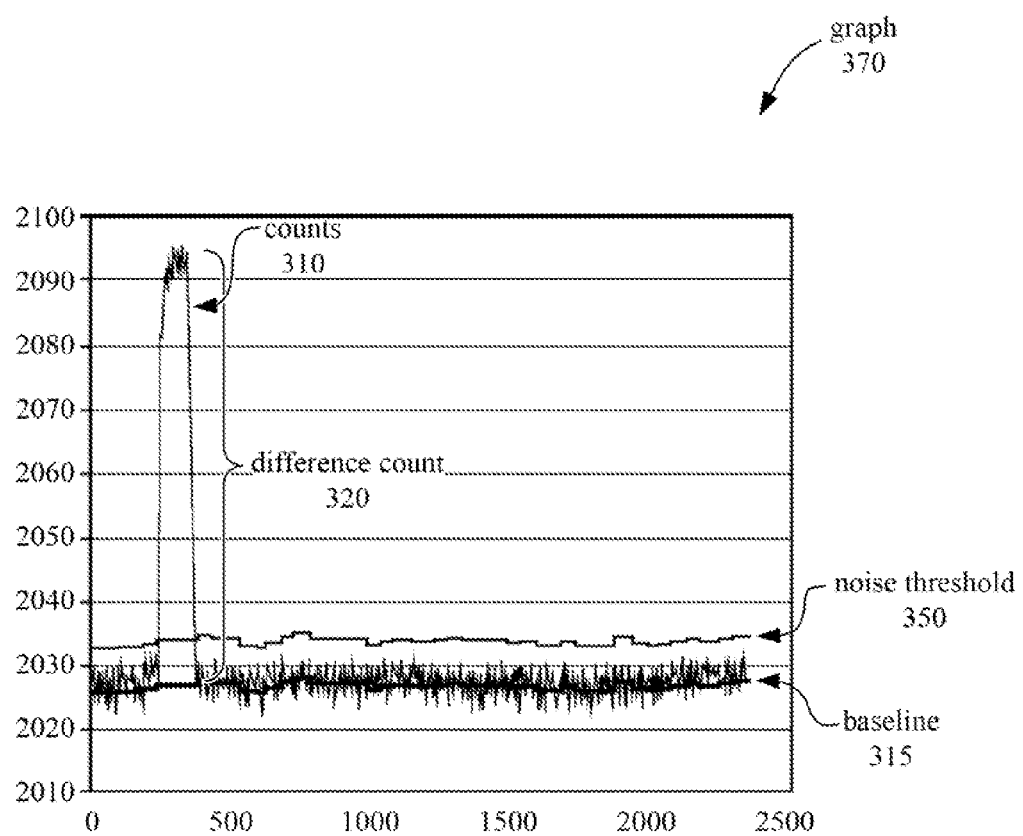
FIG. 3 illustrates a signal generated by a capacitive touch sensor, according to one embodiment.

In one embodiment, the filtered data may further be processed to establish a baseline and a touch signal calculation. FIG. 3 is a graph 370 illustrating a self-capacitance signal measurement on a single sensor element (row or column) and a baseline for the signal measurement. A baseline 315, or reference, may be tracked such that the processing device 110 of FIG. 1A can determine when a touch is present (e.g., finger on sensor element) by comparing the counts 310 (representing the capacitance change due to the presence of a conductive object, such as user's finger) with the baseline 315. The baseline count value 315 may be the average count value that results from a sensor element when no input is present (e.g., no finger or other conductive object present on the sensor element).

In one embodiment, evaluation of the sensor element signal may provide a difference count 320 of the count value 310 that exceeds the noise threshold 350. The noise threshold 350 may be set so that the processing device 110 can discriminate between noise and an input, such as a finger touch on a sensor element. For example, without the presence of a finger on a sensor, the baseline 315 may be approximately 2030 counts. When a finger is present, the count value 310 goes up, for example, to 2095 (and thus the difference count 320 is 45). The count value of 2095 is above noise threshold 350 and is therefore interpreted as an input.

In one embodiment, the baseline value 315 and the noise threshold 350 are periodically updated to account for changes in the system, such as increased or decreased noise levels, humidity, aging, or changes in baseline capacitance of the sensor.

Figure 4A:
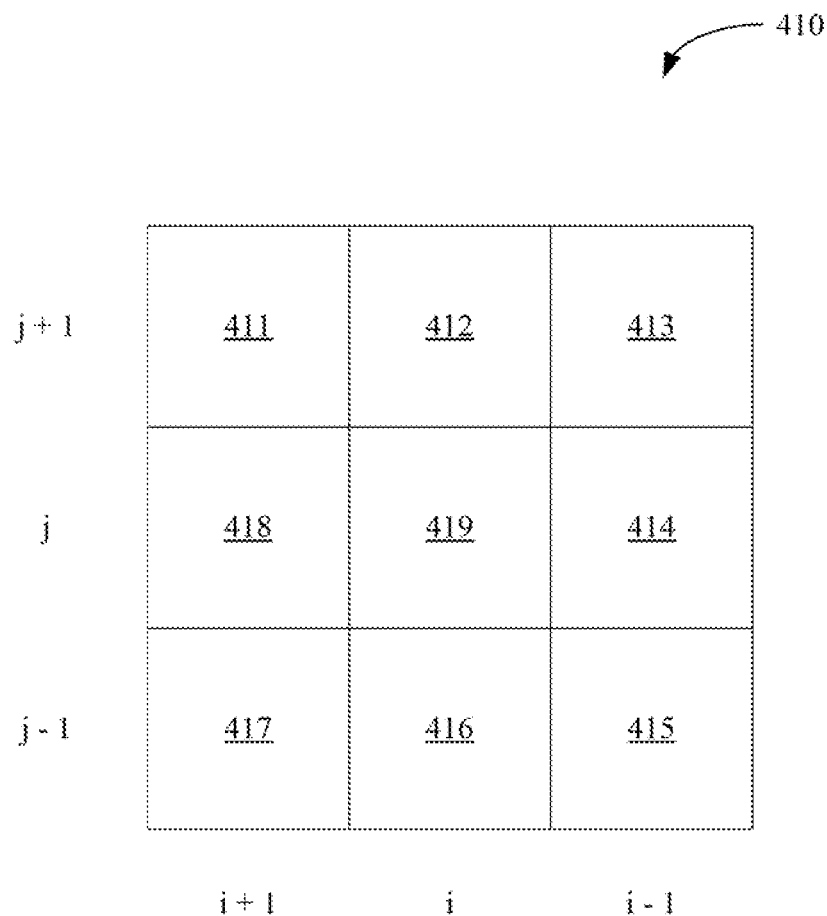
FIG. 4A illustrates cells used for maximum search and centroid calculation, according to one embodiment.
Figure 4B:
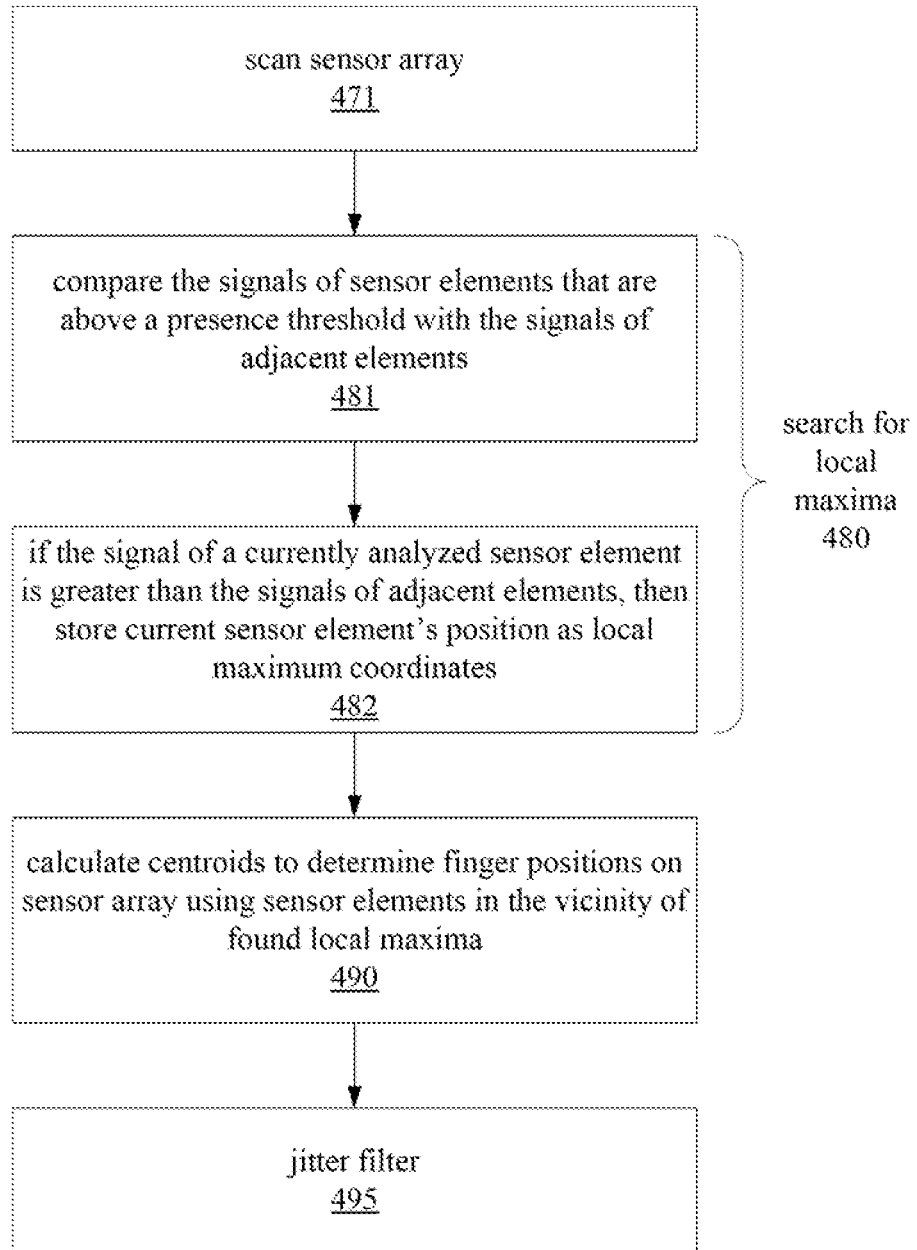
FIG. 4B illustrates a method for interpolating a touch position on a touch sensor array based on the calculation of a centroid, according to one embodiment.

The following discussion on local maxima search is made in reference to FIGS. 2, 4A, and 4B. FIG. 2 illustrates rows and columns that are evaluated for a local maxima search and centroid calculation, according to one embodiment of the present invention. FIG. 4A illustrates cells used for a local maximum search and centroid calculation, according to one embodiment of the present invention. FIG. 4B illustrates a method for evaluating touch positions on a touch sensor matrix based on the calculation of a centroid in the vicinity of each local sensor maxima, according to one embodiment.

In operation 471 of FIG. 4B, the sensor elements in sensor array 121 are scanned. In one embodiment, the scanning may involve the selecting and measuring the self capacitance of each horizontal and vertical sensor element in array 121.

In another embodiment, the scanning may involve selecting each combination of horizontal and vertical sensor elements to measure the mutual capacitance at each intersection of sensor elements in the sensor array 121. In order to simplify the associated data processing, the signal array (which may include capacitance measurements for each intersection) may be treated as a two-dimensional matrix, an example of which is shown in FIG. 4B. Rows and columns of this matrix correspond to the physical rows and columns of the sensor array (e.g., row 212 and column 211 of sensor matrix 121) where the intersections are located.

At block 482, each capacitance value that exceeds a finger presence threshold (a value that, when exceeded, indicates that a finger or other object is detected at the sensor element) is compared with all adjacent elements.

For example, when sensor matrix 121 is scanned for self capacitance and row 213 is detected as having a finger (or other conductive object) present, the capacitance value of row 213 is compared to those of rows 212 and 214 to determine if it is a maximum. Likewise, when sensor matrix 121 is scanned for mutual capacitance with the capacitance values stored in a matrix table like the example shown in FIG. 4A, cell 419 of FIG. 4A may correspond to intersection 222 of FIG. 2. Where a finger is detected as present and the finger presence threshold is exceeded, the capacitance value of cell 419 is then compared to the capacitance values of all adjacent cells (e.g., 411-418).

If the measured capacitance value stored in cell 419 is greater than all adjacent cells 411-418, then the row and column intersection of cell 419, (e.g., intersection 222 of FIG. 2) is marked as a local maximum. It should be noted that the local maxima search operation 480 may be performed using other local maximum search techniques, for example, Hill Climbing and Gradient Descent maxima search methods.

In one embodiment, after a local maximum is found, any centroid algorithm may used for finger position estimation. In one embodiment, all cells (or row and column sensors when evaluated for self capacitance) adjacent to a local maximum are included into the centroid calculation of operation 490. For example, with reference to FIG. 4A, cell 419, where the local maximum was found, and cells 411-418, which are adjacent to cell 419, are included in the centroid calculation. The centroid calculation may be determined according to Equations 1 and 2 below:

$$Xc = Kx \frac{\sum_{k=i-1}^{i+1} \sum_{m=j-1}^{j+1} \text{Signal}[k, m] \cdot k}{\sum_{k=i-1}^{i+1} \sum_{m=j-1}^{j+1} \text{Signal}[k, m]} \quad (1)$$

$$Yc = Ky \cdot \frac{\sum_{k=i-1}^{i+1} \sum_{m=j-1}^{j+1} \text{Signal}[k, m] \cdot k}{\sum_{k=i-1}^{i+1} \sum_{m=j-1}^{j+1} \text{Signal}[k, m]} \quad (2)$$

In Equations 1 and 2, Kx, Ky may be determined depending on a resolution, such as a screen resolution of a display. For example, for a screen resolution of 320×480 pixels, $$Kx = \frac{320}{M-1}; Ky = \frac{480}{N-1}.$$

Alternatively, the resolution may represent other attributes, such as possible physical locations of an actuator, or sound, brightness, power levels, or other physical attributes.

In one embodiment, operation 490 may calculate multiple centroids to determine multiple finger positions on sensor array 121 using cells in the vicinity of the multiple found local maxima. According to operation 495, an additional jitter filter may be used for each Xc and Yc value, according to one embodiment.

In one embodiment, a capacitive touch panel includes an array of capacitive sensor elements arranged in an X axis and a Y axis. The number and spacing of the capacitive sensor elements depends on the physical dimensions of the sensors, screen size, and the number of available inputs to the capacitance sensing device or other ASIC which is tasked with processing the sensor data.

However, in one embodiment, the shape and spacing of sensors can cause irregularities in reported position (i.e., centroid position) as a finger is moved continuously across a succession of sensor elements. The irregularities may cause a "corduroy" pattern to be reported from what was otherwise a smooth/linear path of an object across the touch sensing surface, where the smooth path may be interpreted as a wavy motion.

Figure 5A:
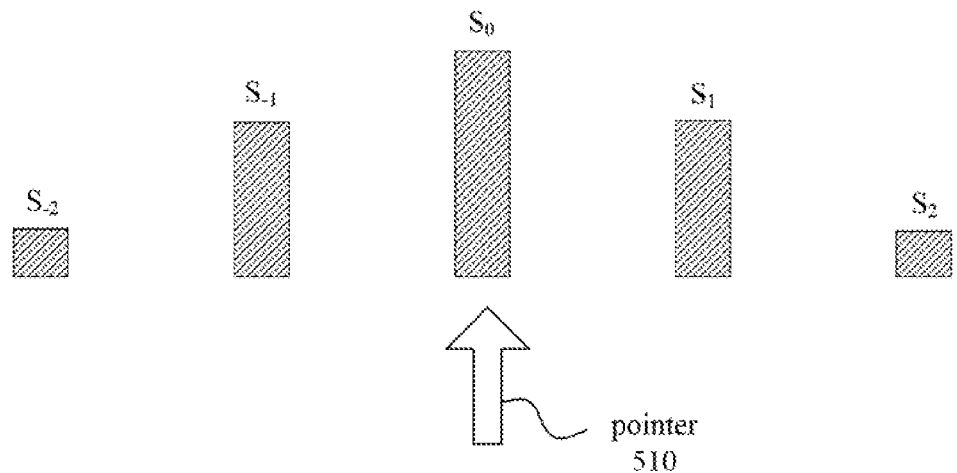
FIG. 5A illustrates signal strength values generated by sensor elements in response to a pointer object, according to one embodiment.
Figure 5B:
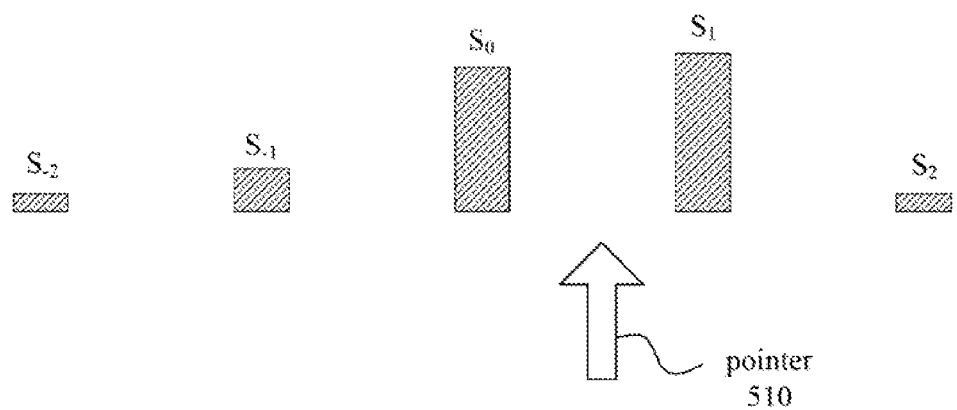
FIG. 5B illustrates signal strength values generated by sensor elements in response to a pointer object, according to one embodiment.

FIGS. 5A and 5B illustrate the differences in reported sensor element signal strength values for a pointer object 501 positioned at two different locations of a touch sensing surface, according to one embodiment. In FIG. 5A the pointer is centered over one of the sensor elements, corresponding to sensor signal $S_0$, and causes a stronger and more symmetric aggregate signal over it and the adjacent the sensor elements.

As the finger is moved from immediately over the sensor generating signal $S_0$ to a location between sensor $S_0$ and $S_1$, the distribution of the measured signal will skew as shown in FIG. 5B. Here, pointer object 510 is between $S_0$ and $S_1$, causing signals that are approximately equal from these adjacent sensors. When these measured capacitance values are used in a centroid calculation without modification, non-linear touch position results are passed to the host 150 and used to control a cursor on a display. This results in a "pitch velocity effect" where a lag in detected position over time is followed by an acceleration of the detected position over time.

Figure 6A:
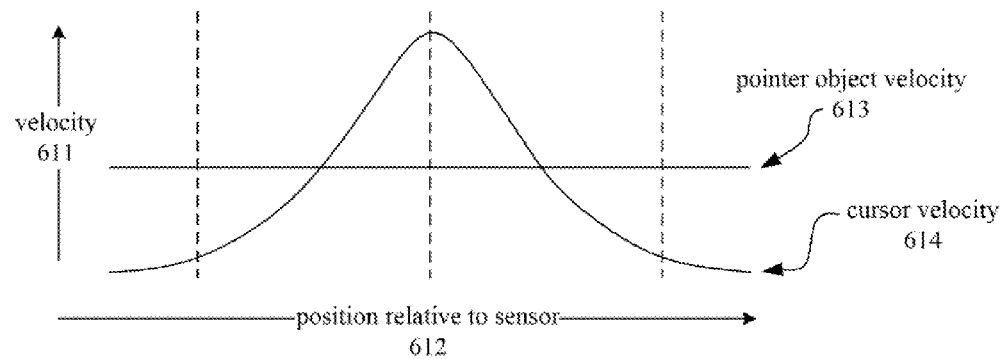
FIG. 6A is a graph depicting velocity of a pointer object and velocity of a cursor, according to one embodiment.

FIG. 6A is a graph illustrating a velocity 613 of a pointer object, such as a finger, moving across the touch sensing surface at a constant velocity, and the velocity 614 of a cursor displayed by host 150 exhibiting the pitch velocity effect as determined by a capacitive touch sensing system, according to one embodiment. In FIG. 6A, the Y-axis is velocity 611 and the X-axis is the position 612 of the pointer object relative to the sensor. Note that the velocity of the pointer object 613 remains constant as the position of the pointer object moves across to the sensor. However, because of the non-linear response of the measured capacitance verses location of the pointer object as it moves across each sensor, the velocity of the cursor, which would ideally match the velocity of the pointer object, rises and falls according to the proximity of the pointer object to a sensor element.

Figure 6B:
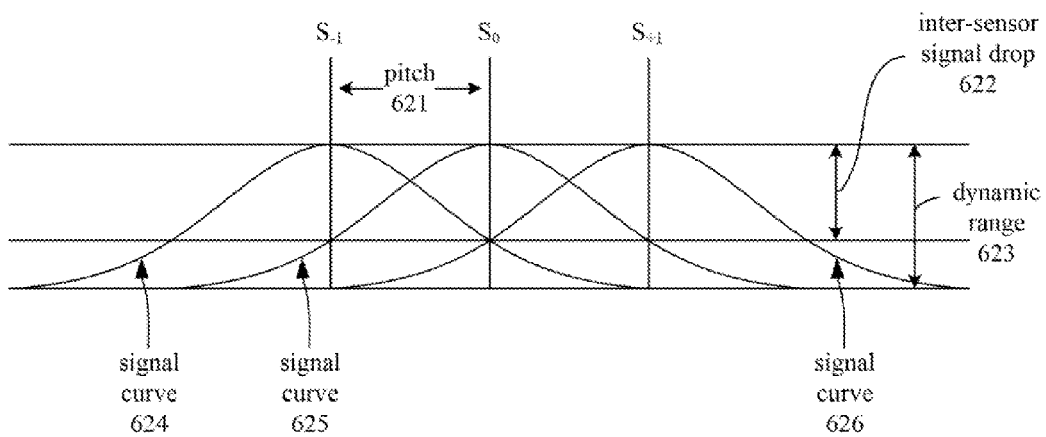
FIG. 6B is a graph illustrating signal strength profiles of multiple adjacent sensor elements in a touch sensor array as a conductive object is moved across them, according to one embodiment.

FIG. 6B illustrates "roll-up" and "roll-off" characteristics of an array of sensor elements, according to one embodiment. Roll-up and roll-off describe the signal strength response of a sensor element as an object, such as a finger, moves towards it, then away from it, respectively. This may occur, for example, when a finger moves along a straight path that perpendicularly crosses each sensor element. The expected roll-up and roll-off as finger-to-sensor distance varies can be roughly modeled, for example, as a normal or Gaussian distribution.

Referring to FIG. 6B, the pitch 621 represents the spacing between sensors, which are identified as $S_{-1}$, $S_0$, and $S_{+1}$. While a pointer object is centered over one sensor element, the inter-sensor signal drop 622 is the difference in detected signal strength values between the sensor element and an adjacent sensor element. In one embodiment, the inter-sensor signal drop 622 is caused by the sensor element pitch. In another embodiment, the inter-sensor signal drop 622 is caused by the shape and pitch of the sensor elements. The greater the pitch, the more pronounced will be the signal drop 622 between sensors. The dynamic range 623 is the range of possible signal strength levels that can be generated by the sensor elements in response to a conductive object.

Signal curves 624, 625, and 626 correspond to sensor elements $S_{-1}$, $S_0$, and $S_{+1}$, respectively. The amount of overlap between signal curves 624, 625, and 626 depends on the shape of the signal roll-off and the pitch 621. The overlap indicates the signal strength value that can be expected from a sensor when a pointer object is directly over another sensor. For example, if the pointer object is over sensor element $S_{-1}$, the full signal strength is generated at sensor element $S_{-1}$, while the sensor element $S_0$ generates a signal strength value that is an inter-sensor signal drop 622 less than the full signal strength. Accordingly, signal curve 624 has dropped by the inter-sensor signal drop 622 at sensor $S_0$. Sensor element $S_{+1}$ generates a signal strength value that is approximately zero, according to signal curve 624.

In one embodiment, an approach for reducing the irregularities caused by sensor element pitch that affect centroid calculation includes pre-conditioning the signal strength data generated by the sensor elements. This approach reduces pitch effects by flattening out the signal drop that is seen between sensors without injecting any loss of resolution in the computation. Thus, with the flattened signal, the signal strength caused by a pointer object directly over a sensor element is not disproportionately high as compared to when the pointer object is not directly over the sensor element. In one embodiment, a Gaussian-based compression pattern may be applied against the sensor data to smooth out the variance between sensors. To reduce computation requirements, this may be applied using a lookup table of pre-computed values.

Figure 7A:
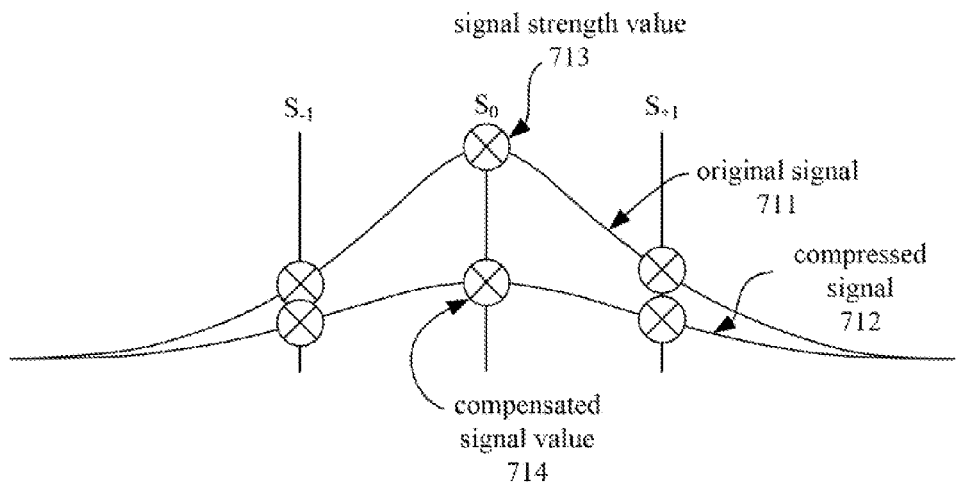
FIG. 7A illustrates translation of an original signal from a set of capacitive sensor elements to a compressed signal, according to one embodiment.
Figure 7B:
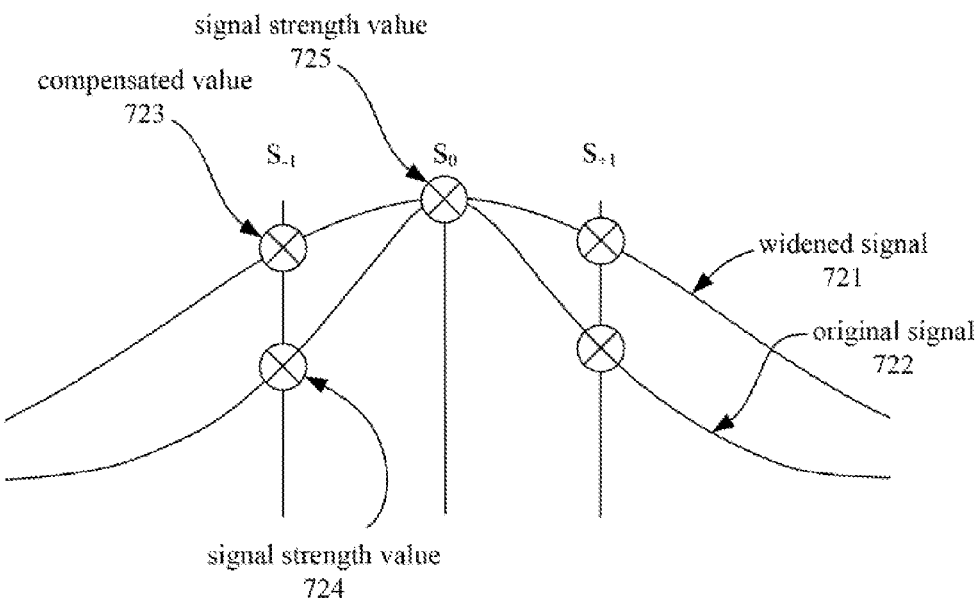
FIG. 7B illustrates translation of an original signal from a set of capacitive sensor elements to a widened signal, according to one embodiment.

FIGS. 7A and 7B illustrate translation of original signal strength values from the sensor elements to compensated signal values, resulting in compressed or widened signals, according to one embodiment.

With reference to FIG. 7A, the original signal 711 is defined by the original signal strength values from each of the sensor elements $S_{-1}$, $S_0$, and $S_{+1}$. In one embodiment, these values have already been filtered or preprocessed for resolution, debouncing, positional jitter, or hysteresis. According to the translation scheme, the signal strength values of the original signal are translated to compensated signal values that define compressed signal 712. For example, signal strength value 713 is translated to compensated signal value 714.

In one embodiment, the original signal strength values are compressed depending on their relationship to the peak sensor, as defined by the compression function. For instance, where C is the generator constant for the compression function, each of the original signal strength values is multiplied by 1/C to flatten the original signal 711 to the compensated signal value 714. In one embodiment, the value of C may be selected for a particular material from which the sensor element is made, or for a particular application for which the touch-sensor is being used.

In one embodiment, this compression function is used to generate pre-computed values that are stored in a lookup table. Each of a number of possible values for the signal strength can then be used to lookup the corresponding pre-computed value.

FIG. 7B illustrates a translation of the original signal 722 to a widened signal 721, according to one embodiment. The original signal 722 includes signal strength value 724, which is translated to compensated value 723 to generate a widened signal 721 that is wider than the original signal 722. In one embodiment, some of the signal strength values may remain unchanged by the translation. For example, signal strength value 725 is not changed by the translation because it is part of both the original signal 722 and the widened signal 721. The widened signal 721 has a decreased inter-sensor signal drop, as compared to the original signal 722.

As with the translation of the original signal 711 to the compressed signal 712, the translation of original signal 722 to widened signal 721 can be performed using a lookup table of pre-computed values. In one embodiment, the table values are pre-computed to span the dynamic range of the sensor inputs.

To avoid losing significant bits during compression, a linear expansion may also be included in the table lookup. In an embodiment where the sensor matrix 121 is measured using self capacitance, the signal strength values from the sensor elements may be used to interpolate the location of a centroid to a higher resolution than the two axial projections of the M and N sensor measurements. In an alternate embodiment where the sensor matrix 121 is measured using mutual capacitance, the signal strength values from the sensor elements may be used to interpolate the location of a centroid to a higher resolution than the grid formed by the M×N sensor measurements. For example, the signal strength values may be used to determine a centroid location for a screen having 320×480 pixels, where M and N are less than 320 or 480. Such a centroid calculation or interpolation scheme may avoid computationally injecting resolution loss by first performing a pre-scaling of each signal level with a "screen pixels per sensor" constant. The resulting centroid is a position value which is reported in "screen pixels". Alternately said pre-scaling may be based on units of millimeters, inches, or other units of measure.

Compared to Equations 1 and 2, Equations 3 and 4 below include a term for a multiplier that is a function of the signal strength value Signal[k,m] measured at an intersection of sensor elements k and m. These multipliers are expressed as f(Signal[k,m]) and g(Signal[k,m]) in Equations 3 and 4 below.

$$Xc = Kx \frac{\sum_{k=i-1}^{i+1} \sum_{m=j-1}^{j+1} f(\text{Signal}[k, m]) \cdot \text{Signal}[k, m] \cdot k}{\sum_{k=i-1}^{i+1} \sum_{m=j-1}^{j+1} \text{Signal}[k, m]} \quad (3)$$

$$Yc = Ky \frac{\sum_{k=i-1}^{i+1} \sum_{m=j-1}^{j+1} g(\text{Signal}[k, m]) \cdot \text{Signal}[k, m] \cdot k}{\sum_{k=i-1}^{i+1} \sum_{m=j-1}^{j+1} \text{Signal}[k, m]} \quad (4)$$

The functions f(Signal[k,m]) and g(Signal[k,m]) are multipliers for translating signal strength values, such as signal strength value 713 of FIG. 7A to compensated signal values, such as signal value 714. In one embodiment, f(Signal[k,m]) and g(Signal[k,m]) apply the translation to X coordinate and the Y coordinate of the centroid, respectively. In one embodiment, the functions f(Signal[k,m]) and g(Signal[k,m]) may be different functions. Alternatively, they may be identical functions.

As previously discussed, Kx, Ky may be determined depending on a resolution, such as a screen resolution of a display. For example, for a screen resolution of 320×480 pixels, $$Kx = \frac{320}{M-1}; Ky = \frac{480}{N-1}.$$

In Equations 3 and 4, the functions f(Signal[k,m]) and g(Signal[k,m]) can be combined with Kx and Ky in a lookup table. For example, the compensation values stored in the lookup table may be Xcomp and Ycomp, where Xcomp[k, m]= Kx·f(Signal[k,m]) and Ycomp[k,m]=Ky·g(Signal[k, m]). Thus, in one embodiment, for an intersection between sensor elements k and m, the lookup table will respond to an signal strength value of Signal[k,m] with Xcomp or Ycomp, depending on whether Xc or Yc is being determined, respectively.

Compared to Equations 1 and 2, the determination of Xcomp and Ycomp using the lookup table is the only significant addition to the computation. The use of a lookup table is less computationally intensive than other available methods, such as the use of Kalman Filters (or similar filters), which may involve processing via multiplication matrices.

The lookup table may also be relatively small. A read-only memory (ROM) table for a signal resolution of $2^{12}$ may occupy at most 8 kilobytes of ROM. In one embodiment, where the dynamic range of the sensor elements is represented using 6 bits, a relatively small lookup table may be used. This enables the use of small tables that would fit well in a small processing platform.

In one embodiment, a Python script or other software tool may be used to generate a lookup table that is customized for a particular array of sensor elements and display resolution.

Figure 8:
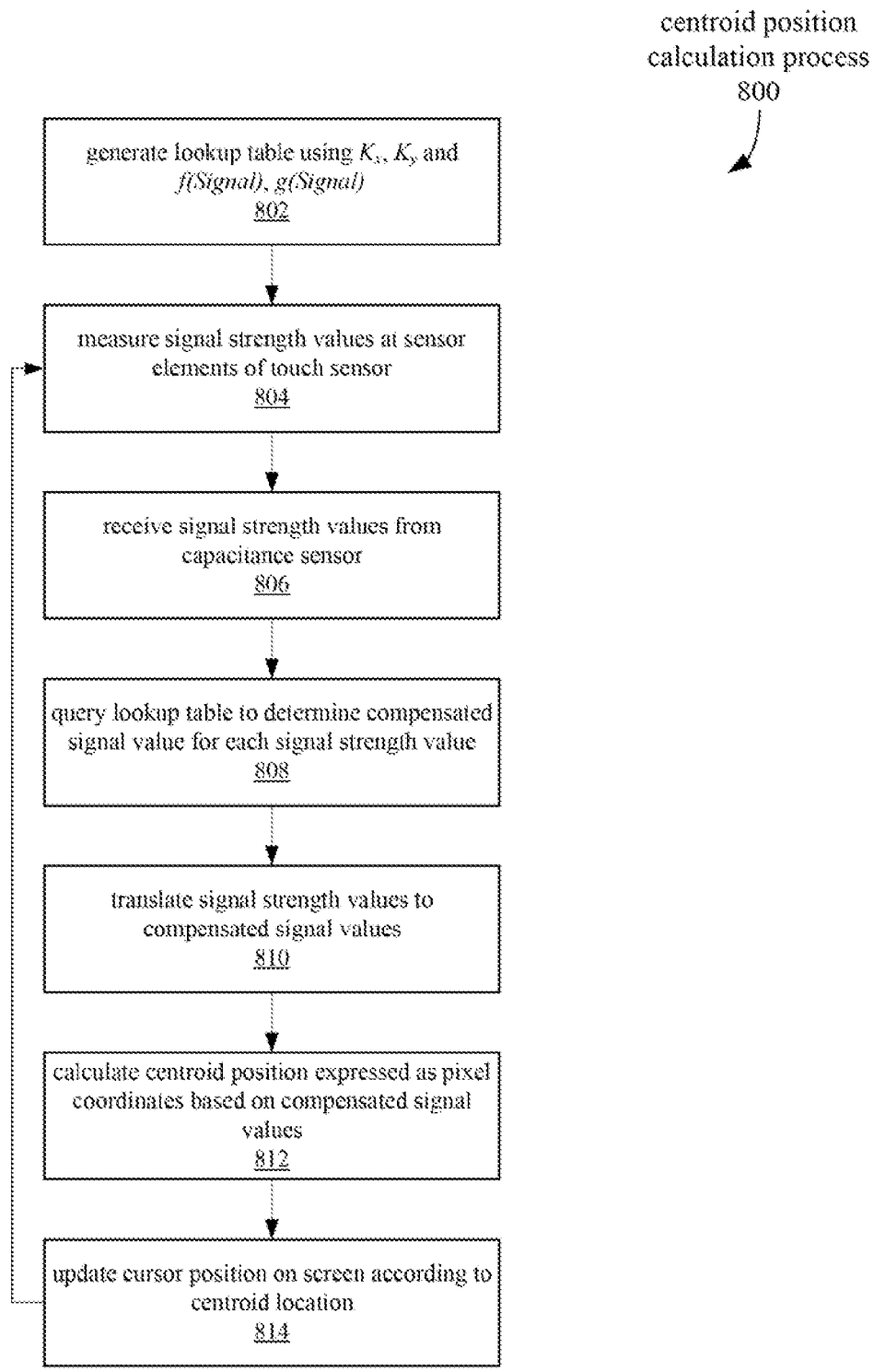
FIG. 8 is a flow chart illustrating a process for calculating a position of a centroid, according to one embodiment.

FIG. 8 illustrates a process for calculating a centroid position, according to one embodiment. Centroid position calculation process 800 may be performed by processing logic, such as data conditioning module 102 or decision logic 151.

Centroid position calculation process 800 begins at block 802, where a lookup table is generated using Kx, Ky, f(Signal)

and g(Signal). For example, the lookup table may be generated using a script or other process executed by processing device 110 or host 150. Alternatively, the lookup table may be generated in a separate computer system. In one embodiment, the lookup table correlates possible signal strength values that may be generated by sensor elements with compensation values Xcomp and Ycomp, where Xcomp[k,m]=Kx·f(Signal[k,m]) and Ycomp[k,m]=Ky·g(Signal[k,m]) for a signal strength value Signal[k,m] that is measured at the intersection of sensor element k and sensor element m of an array of sensor elements. From block 802, the process 800 continues at block 804.

At block 804, signal strength values are measured at the sensor elements of a touch sensor. For example, the signal strength value may be a count value or a digital code that represents a self capacitance of the sensor element, or a mutual capacitance between two sensor elements. Since the capacitance of a sensor element may be affected by the proximity of a pointer object to the sensor element, the signal strength value indicates whether the pointer object is present at the touch sensor. From block 804, the process 800 continues at block 806.

At block 806, the signal strength values are received from the capacitance sensor. In one embodiment, the signal strength values are transmitted from capacitance sensor 101/101' to data conditioning module 102/102'. In an alternative embodiment, where the process 800 is performed by a host 150, the operations of block 806 correspond to transmitting the signal strength values to the host 150. From block 806, the process 800 continues at block 808.

At block 808, the lookup table is queried to determine a compensated signal value corresponding to each signal strength value. In one embodiment, the lookup table returns compensation values Xcomp and Ycomp in response to receiving a signal strength value. Thus, according to block 808, the lookup table is queried with a signal strength value from a plurality of sensor elements and returns compensation values corresponding to their associated signal strength values. From block 808, the process 800 continues at block 810.

At block 810, the signal strength values are translated into compensated signal values. In one embodiment, the compensation values Xcomp and Ycomp do not include factors Kx and Ky, and the signal strength values are translated to compensated signal values in a separate operation from the expansion of the sensor element signal values to a pixel coordinate system. From block 810, the process 800 continues at block 812. Alternatively, the operations of block 808 may be combined with the operations of block 810.

At block 812, a centroid position, expressed as coordinates in a pixel coordinate system, is calculated based on the compensated signal values. For instance, the compensation values Xcomp and Ycomp of block 808 are used with Equations 3 and 4 to determine the coordinates of the centroid in a pixel coordinate system. In one embodiment, the pixel coordinate system identifies locations of pixels of a display screen. Alternatively, the coordinate system may be based on units other than pixels. From block 812, the process 800 continues at block 814.

At block 814, the host 150 updates a cursor position on a display screen according to the centroid location calculated at block 812. In one embodiment where the centroid location is expressed as pixel coordinates in a pixel coordinate system that corresponds to the display screen, the cursor is displayed at the location on the display screen specified by the pixel coordinates of the centroid. From block 814, the process 800 returns to block 804, where the signal strength values are measured at the sensor elements.

Thus, blocks 802, 804, 806, 808, 810, 812, and 814 may be repeated to continuously update the cursor position on the display screen based on the calculated centroid position from a position of a pointer object at the touch-sensing surface. In alternative embodiments, the centroid location may be used to update or control other devices aside from displays, such as actuators, speakers, illuminating devices, or any other device that can be controlled with input from a touch-sensing surface.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus, comprising:
   an input configured to receive a plurality of signal strength values from a touch sensor; and
   a data conditioning module coupled with the input, wherein the data conditioning module is configured to generate a set of compensated signal values, wherein the set of compensated signal values has a first range being different than a second range of the plurality of signal strength values by using a value associator to translate each of the plurality of signal strength values to a compensated signal value, wherein the compensated signal value is a function of its corresponding signal strength value.

2. The apparatus of claim 1, wherein the touch sensor comprises a plurality of sensor elements configured to generate the plurality of signal strength values.

3. The apparatus of claim 1, wherein each of the plurality of signal strength values represents a capacitance of a sensor element generating the signal strength value.

4. The apparatus of claim 1, wherein the signal strength measured from each sensor element of the plurality of sensor elements is used to generate one of the plurality of compensated signal values based on a position of an object relative to the sensor element.

5. The apparatus of claim 4, wherein the one of the plurality of compensated signal values is related to the position of the object according to an approximately Gaussian function.

6. The apparatus of claim 4, wherein a function relating the position of the object to the compensated signal value as compressed has a decreased maximum slope relative to a function relating the position of the object to the signal strength value.

7. The apparatus of claim 1, wherein the data conditioning module is further configured to calculate a centroid based on the plurality of compensated signal values, wherein the centroid represents a location of an input at the touch sensor.

8. The apparatus of claim 7, wherein the centroid identifies a location on a display according to a pixel coordinate system.

9. The apparatus of claim 7, wherein the centroid identifies a location in a linear coordinate system.

10. The apparatus of claim 1, wherein the value associator comprises a lookup table, wherein the data conditioning module is further configured to translate each of the plurality of signal strength values to a compensated signal value by querying the lookup table.

11. A method, comprising:
    receiving a plurality of signal strength values from a touch sensor; and
    generating a set of compensated signal values by translating each of the plurality of signal strength values to a compensated signal value using a value associator, wherein the compensated signal value is a function of its corresponding signal strength value, and wherein a first range of the set of compensated signal values is different than a second range of the plurality of signal strength values.

12. The method of claim 11, wherein the touch sensor comprises a plurality of sensor elements configured to generate the plurality of signal strength values.

13. The method of claim 11, wherein each of the plurality of signal strength values represents a capacitance of a sensor element generating the signal strength value.

14. The method of claim 11, wherein the signal strength measured from each sensor element of the plurality of sensor elements is used to generate one of the plurality of compensated signal values based on a position of an object relative to the sensor element.

15. The method of claim 14, wherein the compensated signal value is related to the position of the object according to an approximately Gaussian function.

16. The method of claim 14, wherein a function relating the position of the object to the compressed signal value has a decreased maximum slope relative to a function relating the position of the object to the signal strength value.

17. The method of claim 11, further comprising calculating a centroid based on the plurality of signal strength values, wherein the centroid represents a location of an input at the touch sensor.

18. The method of claim 17, wherein the centroid identifies a location on a display according to a pixel coordinate system.

19. The method of claim 17, wherein the centroid identifies a location in a linear coordinate system.

20. The method of claim 11, wherein the value associator comprises a lookup table and wherein the translating comprises querying a lookup table.

21. A system, comprising:
    a touch sensor;
    an input configured to receive a plurality of signal strength values from the touch sensor; and
    a data conditioning module coupled with the input, wherein the data conditioning module is configured to generate a set of compensated signal values, wherein the set of compensated signal values has a first range being different than a second range of the plurality of signal strength values by using a value associator to translate each of the plurality of signal strength values to a compensated signal value, wherein the compensated signal value is a function of its corresponding signal strength value.

22. The system of claim 21, wherein each of the set of compensated signal values is a function of its corresponding signal strength value.

* * * * *